Nov. 18, 1924.  
F. H. MOYER  
REVERSING MECHANISM  
Filed March 27, 1922   2 Sheets-Sheet 2  
1,515,869

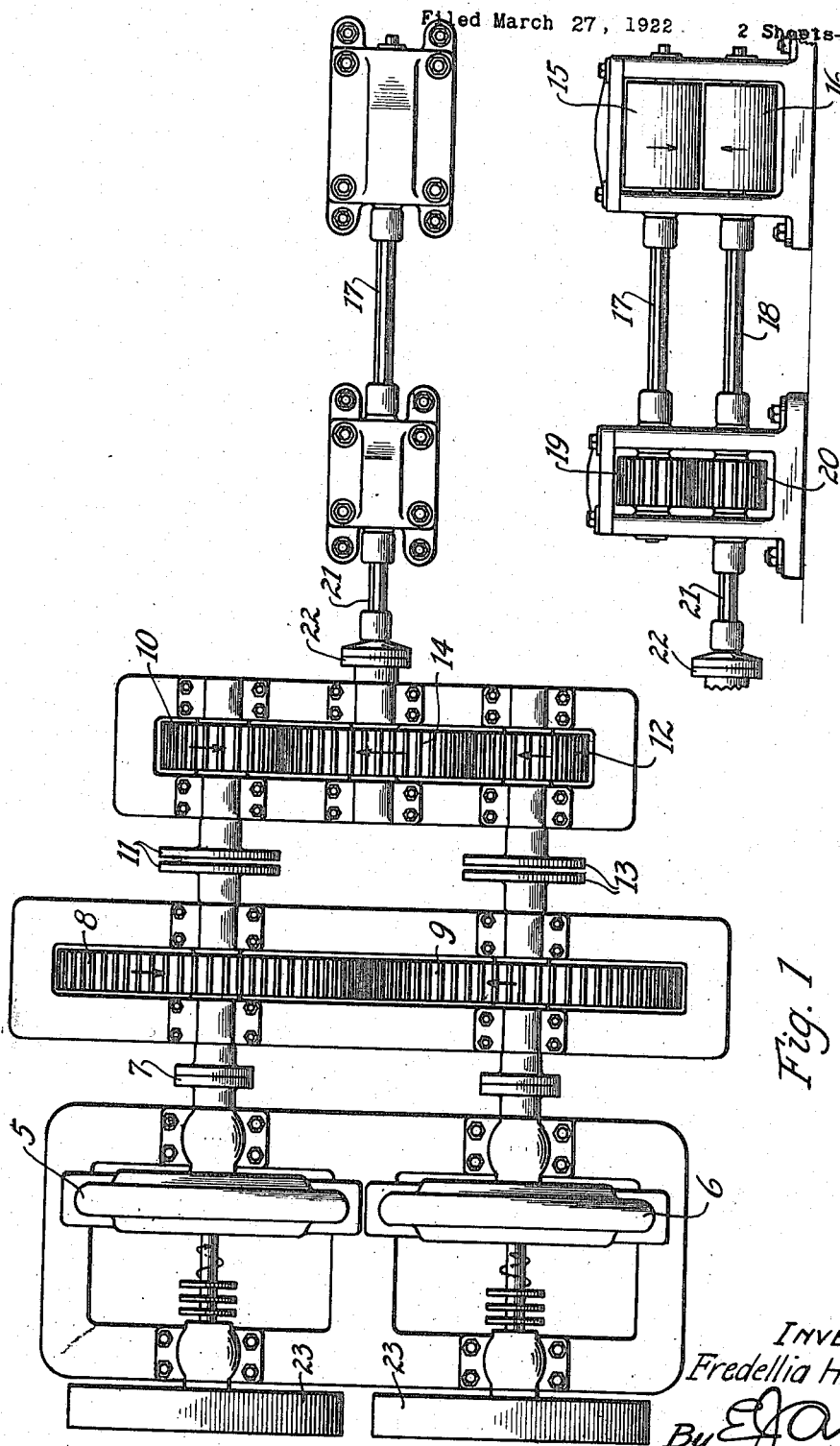

INVENTOR:  
Fredellia H. Moyer  
By E. J. Andrews  
Atty.

Patented Nov. 18, 1924.

1,515,869

UNITED STATES PATENT OFFICE.

FREDELLIA H. MOYER, OF MIDLAND, PENNSYLVANIA.

REVERSING MECHANISM.

Application filed March 27, 1922. Serial No. 547,161.

*To all whom it may concern:*

Be it known that I, FREDELLIA H. MOYER, a citizen of the United States, residing at Midland, in the county of Beaver and State of Pennsylvania, have invented certain new and useful Improvements in Reversing Mechanism, of which the following is a specification.

This invention relates to reversing means and it has for its object the production of improved means for reversing the direction of operation of various machines, particularly where it is desired to reverse frequently. Although the invention is applicable to many types of machines, yet for the purposes of illustration I have herein disclosed it as applied to blooming mills for rolling steel ingots. It is common practice at present to operate mills by means of reversing steam engines or electric motors, and in such a case it is necessary to bring the engine or motor to a full stop and to reverse its direction of rotation in order to reverse the operation of the mill. As such reversals are usually made very quickly it is not practicable to use fly-wheels to carry the load. As a consequence much of the energy supplied is wasted, and the engines or motors used must be correspondingly large to properly do the work. Also, in case of electric motor drives a complicated electric system is required. Hence, one of the objects of my invention is to provide means to obviate the necessity of reversing the engine or motor in order to reverse the direction of rotation of the mechanism. Other objects of the invention will be apparent from a consideration of the following specification and the accompanying drawings.

Figure 3:
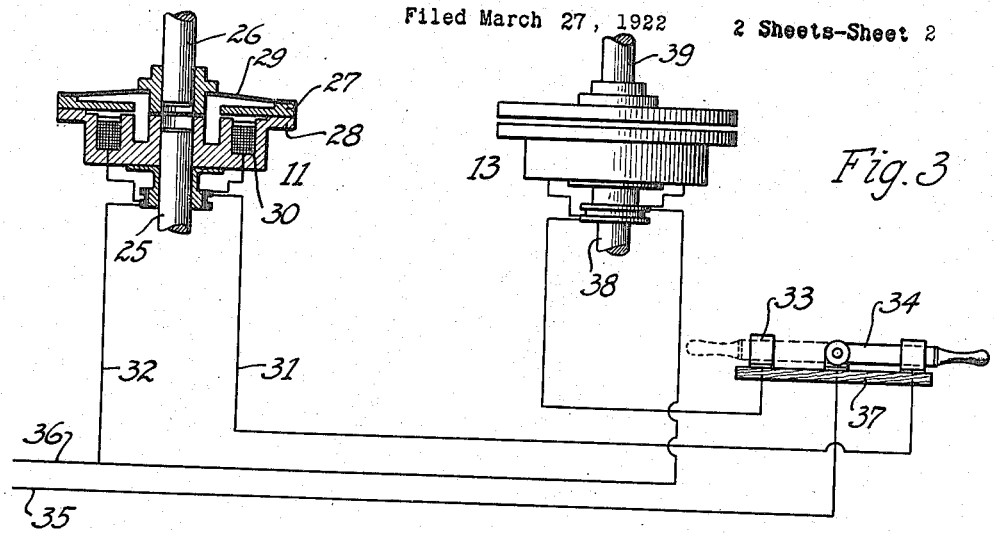
Figure 4:
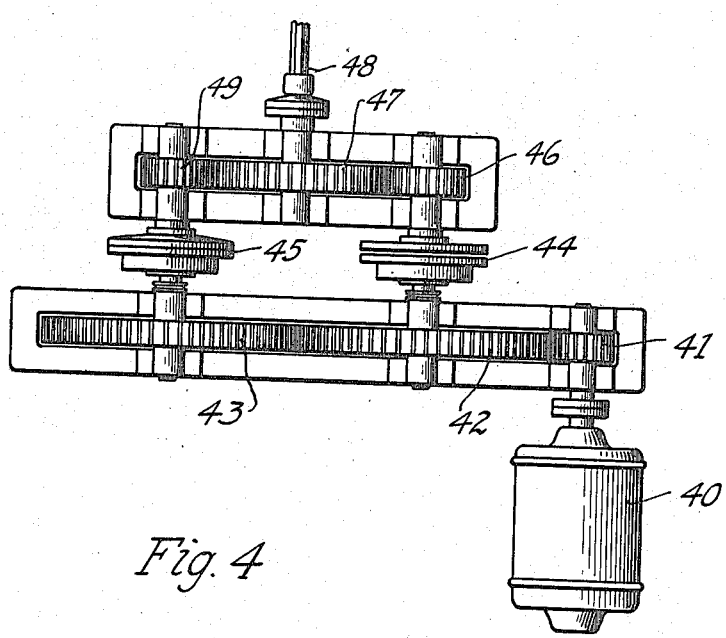

Of the drawings Fig. 1 is a more or less diagrammatic plan view of a rolling mill and reversing and driving mechanism therefor which embodies the features of my invention; Fig. 2 is an elevation of the rolling mill and a portion of the mechanism; Fig. 3 is an enlarged detail view of the clutch mechanism; and Fig. 4 is a plan view of a modified form of the mechanism.

The driving means for the mechanism, which in this instance I have disclosed in order to illustrate my invention, comprises two electric motors 5 and 6 which may be of any suitable type, either alternating or direct current, and adapted to run continuously in one direction. I prefer the three wire alternating non-reversing motors indicated. The driving means, however, may consist of two motors or one motor as may be desired, the mechanism otherwise being substantially the same. One of the motors is connected by any suitable means, such as a flexible coupling 7, with a gear-wheel 8. The gear-wheel 8 meshes with a second gear-wheel 9, which, in this instance, is similar in size and otherwise to the gear-wheel 8. But it is to be understood that these wheels may be unlike in diameter if it is desired to have the speeds of rotation in the two directions unlike, or for any other reason. The gear-wheel 8 is adapted to be operatively connected to a third gear-wheel 10, by means of a clutch. The clutch may be of any suitable nature, mechanical or otherwise. I prefer for the purpose a magnetic clutch 11, operated by suitable electric mechanism, and mounted on the ends of the shafts 25 and 26 of the gear-wheels 8 and 10. The gear-wheel 9 is adapted to be operatively connected with a gear-wheel 12 also by means of a magnetic clutch 13, which is similar to the clutch 11, and is mounted on the shafts 38 and 39 of the gear-wheels 9 and 12. The gear-wheels 10 and 12 each mesh with a gear-wheel 14; and it is to be understood that all of the gear-wheels are properly mounted on suitable shafts which are journaled in suitable bearings supported by suitable frames.

The mill consists in general of the rolls 15 and 16. Each roll is operatively connected by a spindle or shaft 17 or 18 to a gear-wheel 19 or 20, as the case may be; and the wheel 20 is operatively connected to the gear-wheel 14 by means of a shaft 21 and a crab 22. Suitable sleeve couplings may be used in connecting up the ends of the various shafts or spindles so as to allow adjustment of the rolls, or for other reasons. A consideration of this mechanism will show, that, when the motor 5 is rotating in the direction indicated by the arrow, if the clutch 11 only is thrown into engagement, the gear-wheels 8, 10 and 14, and the rolls 15 and 16 will be rotated in the direction indicated by the arrows, the drive being accomplished through clutch 11, and the aforesaid gear-wheels. And this will be the case whether or not motor 6 is also in use. If, however, the clutch 13 is thrown into engagement and the clutch 11 is rendered inoperative, the direction of rotation of the rolls will be reversed, as the drive will be through gears 8, 9, 12 and 14, and, hence, the direction of rotation of the gear-wheel 14 will be reversed, as the direction of rotation of wheel 12 will be as indicated by its arrow.

With this mechanism it will be seen that the gear-wheels 8 and 9, and also the motors 5 and 6, always rotating in the same direction, will act as fly-wheels in conserving energy and smoothing over the effects of changes in load, and it is not necessary to lose the energy of these elements in reversing the direction of rotation of the rolls. And the continuously rotating fly-wheels 23 may be applied, if desired, to assist in conserving the energy. Also it is obvious that, not only may the speed of rotation of the rolls 15 and 16 be predetermined, as may be desired, by proper relative diameters of the gear-wheels, in view of the speed of rotation of the motor, but also the feed of rotation of the rolls in one direction may be made unlike that in the other direction by the selection of gear-wheels of suitable relative diameters.

The clutches 11 and 13 may be of any suitable type, but I prefer for the purpose the well known magnetic clutches indicated by Fig. 3, which comprise the annular, magnetic members 27 and 28 connected respectively to the shafts 26 and 25, the member 27 being connected to the shaft 26 by means of the resilient member 29. When the coil 30 is energized by an electric current the annular members 27 and 28 are brought in contact and held from relative rotation. The coil 30 is energized by means of the wires 31 and 32 connected respectively to the external circuit wires 35 and 36, the wire 31 passing first to a switch 37. When the switch arm 34 is thrown to the right, as indicated by full lines, the clutch 11 will be engaged, but when thrown to the left, as indicated by the dotted lines, so as to come in contact with the clip 33, the clutch 13 will be engaged and clutch 11 will be disengaged. Obviously, by the use of this switch, the clutches cannot be engaged simultaneously.

A modified form of this reversing mechanism is indicated by Fig. 4, and comprises any suitable driving means, such as the motor 40, operating gear-wheels 41, 42 and 43. The gear-wheels 42 and 43 are connected respectively to the gear-wheels 46 and 49 by means of the clutches 44 and 45; and the gear-wheels 46 or 49 operate the shaft 48, in one direction or the other, by means of the gear-wheel 47, the direction of rotation of the shaft 48 depending upon which clutch 44 or 45 is in operation. In this case the shaft 48 corresponds to the shaft 21 of Fig. 1. With this mechanism a single small high-speed motor is adapted to operate the rolls of the mill at normal speed in either direction; and by varying the relative diameters of the gear-wheels 46 and 49, the rate of rotation of the rolls in one direction may be varied as desired with reference to the rate of rotation in the reverse direction.

Although I have herein disclosed a definite set of elements, yet it is to be understood that various modification could be made in the elements without departing from the spirit of my invention as set forth by the following claims.

I claim as my invention:

1. Two continuously rotating driving elements, a driven element, and means for reversing the direction of rotation of said driven element; said means comprising two rotatable members, means operatively connecting said members respectively to said driving elements for rotating said members in opposite directions, and means adapted to alternately and operatively connect said members to said driven element.

2. Reversing mechanism comprising two driving elements, and a driven element to be reversed, a first and a second shaft, means for operatively connecting each of said shafts to one of said driving elements and adapted to rotate the shafts in opposite directions, a third and fourth shaft, means operatively connecting said third and fourth shafts with said driven element, and means for detachably but operatively connecting said third shaft with said first shaft, and other means for detachably but operatively connecting said fourth shaft with said second shaft.

3. Reversing mechanism comprising two driving elements, two main shafts, said shafts being operatively connected respectively with said elements, gearing connecting said shafts for rotating them in opposite directions, an auxiliary shaft coaxial with each of the said two shafts, clutch means adapted to engage each of the pairs of coaxial shafts, a gear-wheel fixed to each of the auxiliary shafts, a third gear-wheel meshing with each of the other gear-wheels, a driven element, and means operatively connecting said driven element with said third gear-wheel.

4. Rolling mill apparatus comprising a pair of rolls, a rotatably mounted gear-wheel, means operatively connecting one of said rolls with said wheel, two auxiliary shafts, a gear-wheel fixed to each shaft and meshing with said first mentioned gear-wheel, two main shafts, clutch means capable of alternately connecting the respective auxiliary shafts with the main shafts, a gear-wheel mounted on each of the main shafts, said last mentioned gear-wheels arranged to mesh with each other, and independent means for rotating each of said main shafts.

5. Reversing mechanism comprising a driving element, two main shafts, one of said shafts being operatively connected with said element, gearing connecting said shafts for rotating them in opposite directions, an auxiliary shaft coaxial with and abutting against each of the said two shafts, clutch means adapted to engage each of the pairs of coaxial shafts, a gear-wheel fixed to each of the auxiliary shafts, said gear-wheels being of unlike diameters, a third gear-wheel meshing with each of the other gear-wheels, a driven element, and means operatively connecting said driven element with said third gear-wheel.

In testimony whereof, I hereunto set my hand.

FREDELLIA H. MOYER.